INVENTOR.
George R. Ericson

Nov. 13, 1956  G. R. ERICSON  2,770,224
INTERNAL COMBUSTION ENGINES
Original Filed Dec. 21, 1950  11 Sheets-Sheet 4

INVENTOR.
George R. Ericson

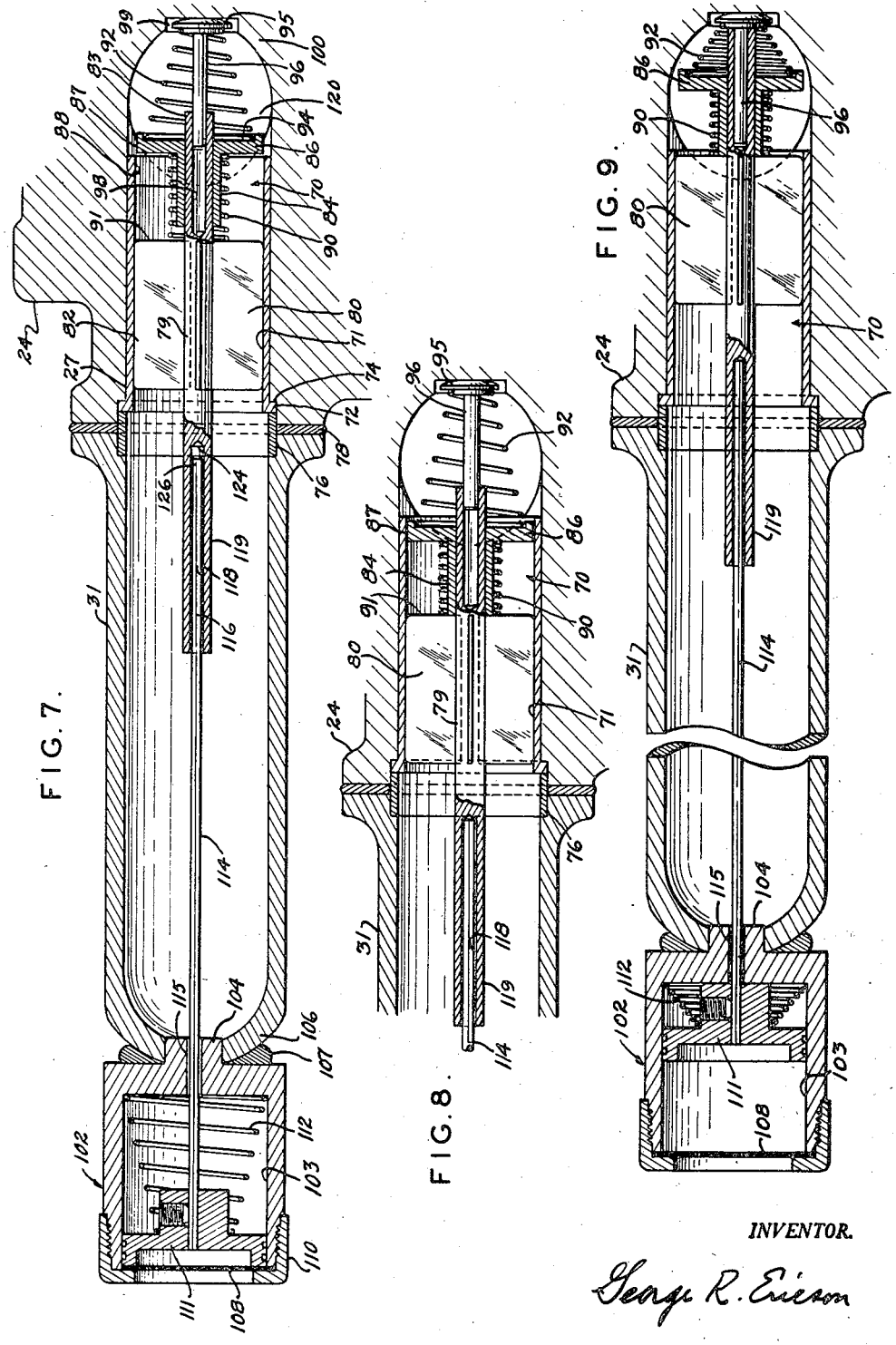

Nov. 13, 1956 G. R. ERICSON 2,770,224
INTERNAL COMBUSTION ENGINES
Original Filed Dec. 21, 1950 11 Sheets-Sheet 6

INVENTOR
George R. Ericson

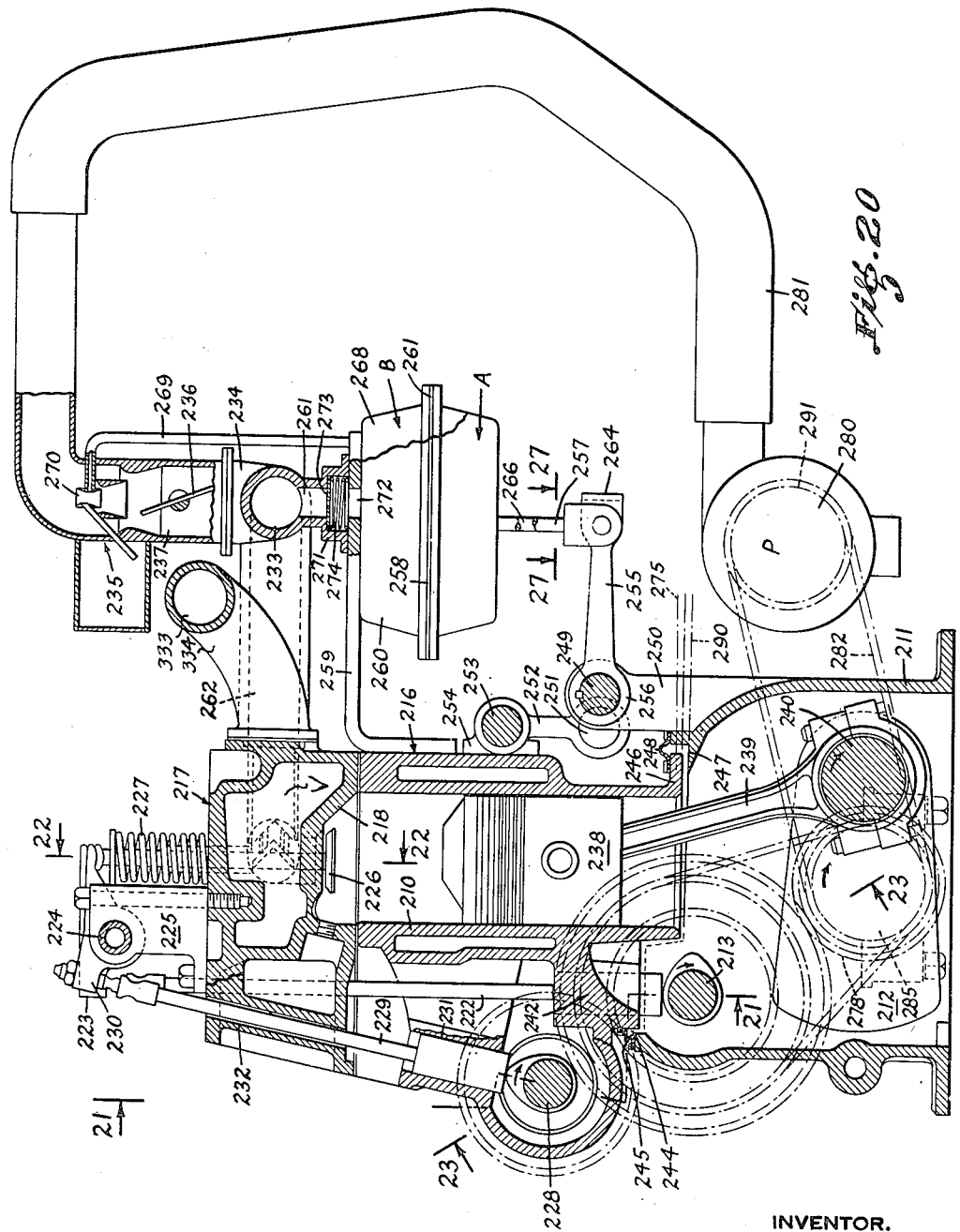

Nov. 13, 1956  G. R. ERICSON  2,770,224
INTERNAL COMBUSTION ENGINES
Original Filed Dec. 21, 1950  11 Sheets-Sheet 11

INVENTOR.
George R. Ericson

United States Patent Office 2,770,224
Patented Nov. 13, 1956

2,770,224

INTERNAL COMBUSTION ENGINES

George R. Ericson, Kirkwood, Mo.; Mary A. Ericson, executrix of said George R. Ericson Original application December 21, 1950, Serial No. 202,074. Divided and this application May 17, 1952, Serial No. 288,467

11 Claims. (Cl. 123—48)

This invention relates to improvements in internal combustion engines, and more particularly to engines of the variable compression ratio type. The present improvements are suitable in particular, to engines which in normal operation, are subject to relatively wide variations in speed and loading, as engines for automotive use and the like.

The instant invention is a division of my application Serial No. 202,074 filed December 21, 1950, now abandoned, which application is a continuation-in-part of application Serial No. 788,195, now abandoned, and application Serial No. 76,051, now abandoned.

In automotive engines of conventional four-cycle character, wherein the compression clearance is constant for all engine operating conditions, the effective or peak pressure varies in proportion to the volumetric intake of fuel charge. The prevailing practice is to design the engine for substantially maximum power output at a selected speed preferably in the upper range of operating speeds, with due consideration given in design, to the extent to which the combustible mixtures can be compressed without producing pre-ignition or objectionable detonation. Thus, the fixed compression clearance is determined such as to afford the desired high effective compression ratio and engine torque at the selected high speed. However, since it is impossible without supercharging, to introduce a full charge to the cylinder at high engine speeds, it is necessary in order to approach or obtain the aforementioned high effective compression ratio, to determine the timing of intake valve actuation such that the intake valve remains open for an appreciable time after the piston has passed bottom dead center. But in an engine as so designed, and which is throttle controlled, it is evident that during throttled operation, the reduced volume of combustible mixture drawn into the cylinder will not be compressed to as great an extent as the larger volume or full charge drawn in under wide open or nearly wide open throttle conditions. Consequently, the efficiency of the engine will vary widely between closed and full-open throttle operations. Moreover, and because of the delayed closure of the intake valve in the compression cycle, a substantial portion of the fuel charge induced to the cylinder at low engine speeds and particularly under low speed wide-open throttle conditions, is rejected back into the intake manifold. This results in reducing the effective compression ratio below that, which from the standpoint of power and torque efficiency, is most desirable under such operating conditions.

It is desirable, therefore, in order to approach the optimum effective compression of the fuel mixture under any given throttle setting and engine speed and load conditions within the operating range of the engine, to increase the effective compression ratio as the indrawn charge is reduced either by throttling or by restriction consequent to increased engine speed, and conversely, to decrease the effective compression ratio with increase in the volume of the indrawn charge under open throttle and reduced speed conditions. Since the volume of fuel charge entering a cylinder is determined in large part by the degree of intake manifold vacuum, and further since the manifold vacuum is directly reflected of the engine speed and load conditions as well as the position of the throttle valve, it has been proposed in my Patent 2,523,105 to utilize intake manifold pressure or vacuum as the controlling agency, or influence, in the automatic regulation of cylinder compression.

Control of the compression ratio through vacuum force posterior of the throttle valve is entirely efficient in the lower speed range but in the higher speed range the intake valve is not open long enough for the desired charge volume to flow into the cylinders and as vacuum in the manifold is low under such operating conditions, compression ratio is thereby regulated too low for peak compression in the cylinders.

It is customary to operate the sets of intake and exhaust valves through mechanisms actuated by a common camshaft driven from the crankshaft by suitable drive mechanism. Such operation of the valve actuating mechanism will not permit valve actuation or timing whereby maximum volumetric efficiency and fuel economy can be obtained under all engine operating conditions, so timing selection is made as a compromise, slightly, but not completely, favoring maximum volumetric efficiency in the higher speed and load range. The degree of overlap of the closing exhaust valve and opening inlet valve necessary for best volumetric efficiency at high speeds prevents regular firing when the throttle is in or near the idle position. The exhaust valve is usually timed to close sufficiently late in the higher speed and load range to insure clearance of exhaust gas from the cylinders, but this timing in the low speed and load range will be such that some of the exhaust gas is drawn back into the cylinders thereby undly diluting the incoming fuel charge and causing roughness in engine operation.

An object of the present invention, therefore, is to provide a throttle controlled, four cycle internal combustion engine embodying provisions of novel and effective character, for effecting automatic variation of the cylinder-piston clearance or compression space such as to determine a practical maximum compression ratio for any throttle setting and speed and load condition of the engine, and for preventing charge rejection from the cylinder back into the intake conduit under conditions of engine operation when there is a tendency for such rejection to take place.

Another object of the invention is to provide an ingine in accordance with the foregoing object, wherein the anti-rejection means functions automatically to prevent or reduce to a negligible minimum, cylinder loss of charge volume during operation of the engine in the lower speed range, and further wherein provision is made for rendering the anti-rejection means inoperative during high speed operation of the engine.

A further object of the invention is to provide for use in an engine of the character indicated, a control valve device formed and constructed as a unit, adapted for positionment in the cylinder intake passage anterior to the engine operated intake valve, and operative to prevent cylinder loss of charge volume during low speed operation of the engine.

A still further object is to provide a control valve unit according to the foregoing object, embodying a highly sensitive, mechanically balanced suction and flow responsive valve means characterized by a relatively quick, non-slamming action.

Another object of this invention is to improve the volumetric efficiency of an engine in the higher speed range of its operation through the employment of a second device responsive to vacuum anterior of the throttle valve, effective to increase the compression ratio as the engine speed increases.

Another object of the present invention is to provide for maximum volumetric efficiency, fuel economy and power output in an internal combustion engine through variance of the compression ratio and the timing of the inlet and exhaust valve in accordance with optimum requirement for all engine operating conditions.

Another object of the invention resides in a method of controlling the compression ratio and valve timing of an engine to provide maximum volumetric efficiency when the engine is under heavy load and improved fuel economy under all operating conditions.

Another object of the invention is to provide a variable compression ratio type of engine in which the timing of the inlet and exhaust valves will vary automatically with the compression ratio variance to provide maximum volumetric efficiency when required and fuel economy under all operating conditions.

Another object of the invention is to provide a variable compression ratio engine with bearings for pivotally mounting a cylinder structure on a cam shaft in the crankcase that will be capable of satisfactory withstanding the loading and pivotal movement without subjecting the camshaft bearings to heavy loads.

Still another object of the invention is to utilize pressure conditions posterior and anterior of the throttle valve of an engine as the controlling agency or influence in the automatic regulation of cylinder compression ratio as facilitated by the novel provisions presently to be described.

These and other objects of the invention will be apparent to those skilled in the art from a study of the following description and accompanying drawings, in which:

Fig. 7 is an enlarged, fragmentary sectional view of the engine as taken along the line 7—7 in Fig. 1, illustrating an anti-rejection control valve unit of a presently preferred form, in operative relation to the cylinder intake passage and connected manifold;

Fig. 8 is a fragmentary sectional view following the view of Fig. 7, but showing the control valve in a closed position;

Fig. 9 is a fragmentary sectional view similar to that of Fig. 7, but illustrating the control valve in full-open position as effected by a manifold pressure responsive servo-motor;

Fig. 20 is a transverse sectional view of an engine with a modified control for the compression ratio shifting mechanism and a modified form of valve timing control mechanism;

Figure 1:
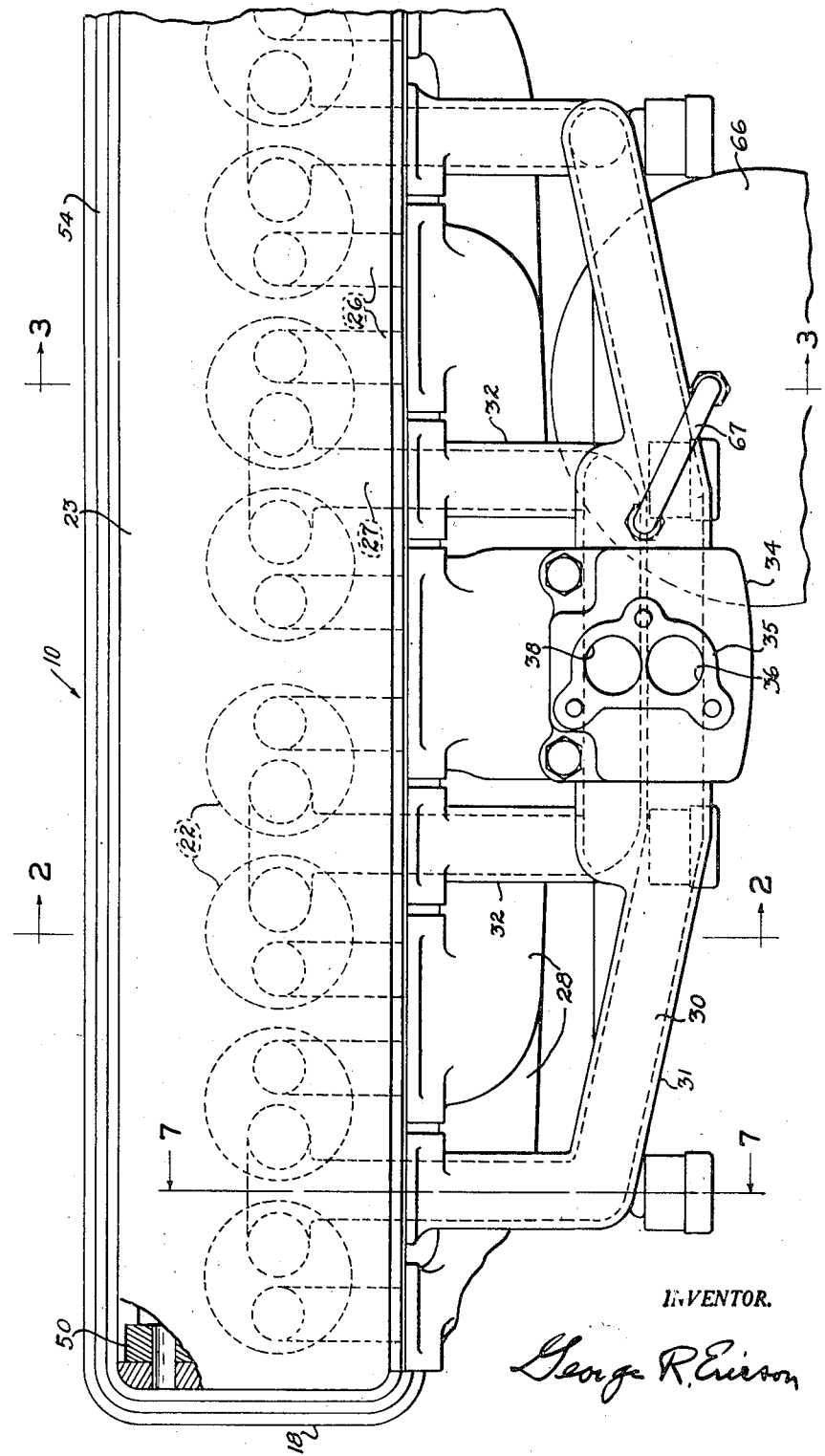
Fig. 1 illustrates in plan elevation, a valve-in-head type of internal combustion engine in which is embodied the present improvements, the view showing the cylinder head intake and exhaust passages in phantom outline and omitting the overhead valve actuating mechanism.

Referring to the drawings, Figs. 1 through 17, illustrate the application of the invention to an internal combustion engine of four-cycle, valve-in-head type. The engine according to the present example, is a multi-cylinder automotive engine, only one cylinder of which is shown in vertical transverse section in Fig. 2 and designated by the numeral 10. In the construction of the engine, the crankcase is provided as a separate structure, including opposite side walls 11 and 12, end walls 18 (only one appearing in Fig. 1), and an inwardly directed longitudinal flange 13 near the upper end 14 of wall 12. A crankshaft 15 and the intake and exhaust valve actuating camshaft 16 are operatively supported in the crankcase, with the camshaft disposed adjacently below the upper margin 17 of the crankcase side 11. Drive of the camshaft may be effected in any suitable manner, as by a gear and pinion arrangement (not shown) which for the present four-cycle engine, is adapted to afford a 2:1 drive ratio for effecting the required one-half engine speed rotation of the camshaft.

Figure 2:
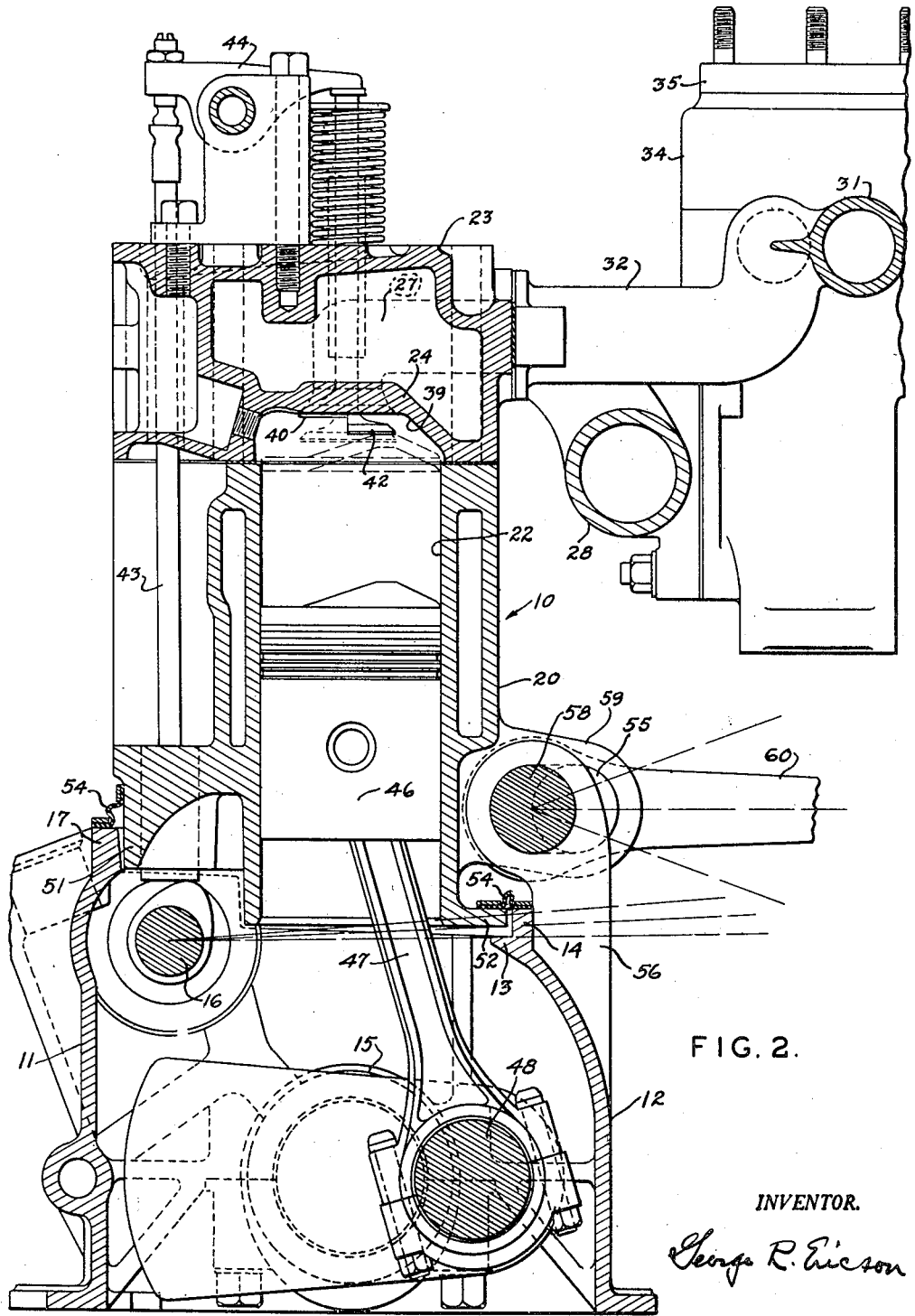
Fig. 2 is a vertical sectional view taken transversely of the engine in the zone of a cylinder thereof, as taken along the line 2—2 in Fig. 1, showing features of the invention, this view showing valve operating mechanism.

The cylinder assembly comprises a cylinder block 20 providing a plurality of in-line cylinders 22 shown in broken outline in Fig. 1, and one thereof in vertical section at 10 in Fig. 2, and a cylinder head structure 23 affording a cylinder head 24 (Fig. 2) for each cylinder. Head structure 23 which is secured to the block 20 in suitable manner, is formed to provide exhaust discharge passages 26 individual to the several cylinders, and intake passages 27 each leading to an adjacent pair of cylinders, these passages appearing in broken outline in Fig. 1. One of the intake passages is shown in horizontal section in Fig. 10.

As appears in Fig. 1, an exhaust manifold 28 is provided for the exhaust passages 26, while an intake manifold 30 is associated with the cylinder head intake passages 27. In the present example, the intake manifold 30 is of divided construction, providing outer branches 31 leading to the intake passages 27 at the opposite ends of the cylinder assembly, and separate inner branches 32 leading to the intermediate intake passages 27. The central part 34 of the manifold is jacketed for connection to the exhaust manifold, to afford the conventional "hot spot" provision, and on part 34 is a flanged seat 35 for receiving and mounting a throttle-controlled, dual-flow carburetor (not shown) of any well known or conventional construction. The carburetor delivers fuel mixture through manifold port 36 to the branches 31, and separately through manifold port 38 to the branches 32.

Each cylinder head 24 is recessed at 39 (Fig. 2), the recess forming a part of the cylinder combustion space and defining by present preference, the major part of the cylinder-piston clearance or compression space. An exhaust passage 26 and an intake passage 27 open through the head 24 in direct communication with recess 39, these passages being controlled respectively, by exhaust and intake valves 40 and 42 (Fig. 2) suitably operatively supported on the cylinder head to open inwardly of recess 39. Valves 40 and 42 are engine operated, as from the camshaft 16 through a push rod 43 and rocker arm assembly 44 associated with each valve.

Reciprocally disposed in each cylinder is a piston 46 which is operatively connected by a connecting rod 47, to a crank arm 48 of crankshaft 15 (Fig. 2). As indicated in the figure referred to and Fig. 6, engine timing of the intake valve 42 is determined as for the purpose hereinbefore noted, to be such that the intake valve closes only after the piston has progressed in the compression cycle, a predetermined appreciable distance inwardly of the cylinder from the bottom or outer dead center position of the piston. In Fig. 2, the intake valve is shown open but about to close, while the piston appears at a point in its compression stroke, well beyond bottom or lower dead center.

The cylinder assembly is provided as a complete unit, apart from the crankcase assembly, and is supported for pivotal displacement relative to the crankcase about an axis off-set from the longitudinal center axis of the engine. Advantageously, the cylinder unit is pivotally mounted on the camshaft 16 as an axis, by bracket members or bosses 50 (Fig. 1) at the ends of the block, and by additional bosses (not shown) if desired, at intermediate points along the block, these mounting bosses being arranged in depending relation to the longitudinal side 51 at the base of the block. The opposite longitudinal base margin 52 of the block, overlies the crankcase flange 13 in cylinder unit assembly, and seats thereon in one operative position of the unit.

As a means for sealing the clearance space between the cylinder block and crankcase, against entrance of dirt and foreign matter as well as against discharge of cranksase oil out through such space, there is provided a flexible member or diaphragm 54 of suitable material, arranged about the block with one margin secured to the block and the other margin secured to the crankcase side margins 14 and 17 and the upper margins of crankcase end walls 18. The flexible member thus effects the desired seal, while permitting pivotal displacement of the cylinder unit relative to the crankcase.

Figure 3:
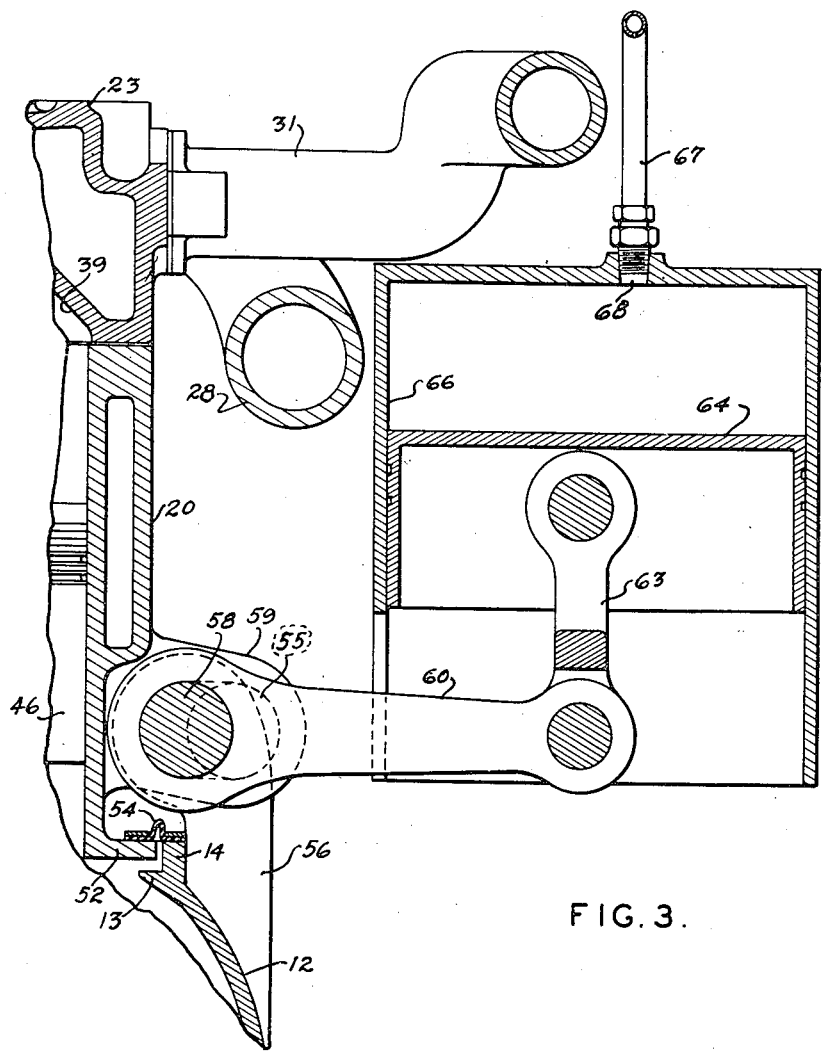
Fig. 3 is a fragmentary vertical sectional view taken along lines 3—3 in Fig. 1, showing the suction operated device for controlling the position of the cylinder unit.

Displacement of the cylinder unit about the camshaft 16, is here effected through a crankshaft 55 (Figs. 2 and 3) having its ends journalled in bearing blocks 56 upstanding on the crankcase side 12. At spaced points along the crankshaft 55 are offset or eccentric portions defining cranks 58 (only one here shown), each crank 58 being received through a block or boss 59 rigid with the cylinder block 20. An operating arm 60 has one end secured to the crankshaft 55, and its opposite end 62 pivotally connected to one end of a connecting rod 63 (Fig. 3). The opposite end of rod 63 is in turn, pivotally connected to a piston 64 disposed in a cylinder 66, the cylinder being suitably rigidly mounted preferably on the engine crankcase (Fig. 3). The cylinder 66 and piston 64 constitute a suction or servomotor, which is made responsive to intake manifold pressure by a pressure or suction transmitting conduit 67 between port 68 in the top of cylinder 66 (Fig. 3) and the engine intake manifold 30 (Fig. 1).

Since in the valve-in-head cylinder assembly as shown, compression adjustment appropriate to the fuel charge admitted under any condition of carburetor throttle position and engine speed and loading, is obtainable by positionment of the cylinder unit within a comparatively small range of pivotal displacement thereof, the degree of eccentricity of the cranks 58 is correspondingly small, as such is indicated in Figs. 1 and 2. Consequently, the present cylinder unit displacement control affords a decided mechanical advantage in favor of the suction device or servomotor 64—66, which thus greatly facilitates compression control in direct accordance with intake manifold pressure, as this will appear more fully hereinafter.

Figure 4:
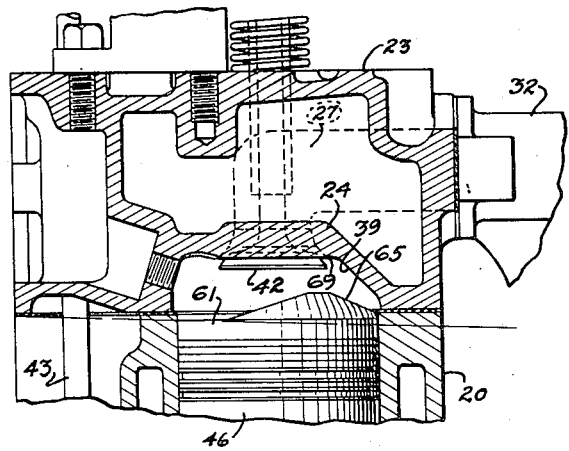
Fig. 4 is a fragmentary vertical sectional view through a cylinder and head structure, showing the piston-combustion chamber relationship obtaining at upper dead center position of the piston, with the cylinder unit at the limit of its upward displacement wherein the piston clearance in the combustion chamber is at a maximum.

In an arrangement of compression control as here exemplified, when the cylinder unit is at one extreme of its pivotal movement wherein the cylinder base margin 52 is spaced above the crankcase wall flange 13, the cylinder-piston clearance at top dead center position of the piston, will be that shown by Fig. 4. As there appears, the head end 61 of the piston does not enter the cylinder head recess 39, while the raised crown portion 65 of the piston enters the recess 39. Consequently, the clearance of the piston head and crown portion relative to the top surface 69 of the cylinder head recess, is a maximum, so that for this position of the cylinder unit, the compression space is large or at maximum volume (considered at top dead center of the piston) for the engine shown. Conversely, and since the piston 46 has a fixed stroke relative to the crankcase, when the cylinder unit is pivotally displaced to its lowermost position wherein the block margin 52 rests upon the crankcase flange 13, the clearance at top dead center position of the piston will be that illustrated by Fig. 5. In this instance, piston head end 61 projects into the cylinder head recess 39 while the piston crown 65 is wholly within the recess. Accordingly, the compression space at top dead center of the piston, is a minimum for the engine shown.

During engine operation, the peak compression and combustion pressures in the several cylinders, reacting on the cylinder heads 24, tend to lift the cylinder unit pivotally about the camshaft 16. Such tendency to cylinder unit lift is transmitted to the eccentrics 58 of shaft 55 and therethrough to the servo-motor arm 60 and piston 64, tending to pull down the latter in servo-motor cylinder 66, against the opposing suction force in the cylinder. However, since in a multi-cylinder engine of the character exemplified, compression and combustion take place sequentially as to the several cylinders, or in a predetermined regular order of cylinder firing, the effective force tending to lift the cylinder unit is at any instant of engine operation, the resultant of the compression and combustion pressures obtaining in those of the cylinders undergoing the cycles of compression and combustion at such instant. Accordingly, throughout engine operation the cylinder unit is subjected to a resultant or mean effective force tending to lift the unit. In the present example, such mean effective force acting on the eccentrics 58, although in reduced effect thereon as will appear presently, is utilized in opposition to the intake manifold pressure as the controlling influence, operative through the servomotor 64—66, to determine cylinder unit positionment in the regulation of cylinder compression.

It will appear from the present arrangement of cylinder unit mounting, affording a pivotal support thereof along one longitudinal side of the unit, as upon the camshaft 16, that very substantially less than the full mean effective force of compression and combustion will be effective on the eccentrics 58. Moreover, the influence thereof on the eccentrics is still further reduced by the weight of the entire cylinder assembly which, acting about the camshaft as the off-center pivotal axis of the cylinder unit, provides an appreciable force in opposition to the indicated mean effective force of compression and combustion. Accordingly, by predetermining and properly designing the arm and eccentric connections between the cylinder unit and the servo-motor 64—66, such as to provide as hereinbefore noted, an effected mechanical advantage in favor of the servo-motor, and further, by determining the suction displacement capacity of the servo-motor, the mean effective cylinder force reduced in its effect upon the eccentrics 58 as above described, can be balanced with intake manifold suction acting on piston 64, such as to assure pivotal positionment of the cylinder unit in direct accordance with intake manifold pressure or vacuum under all engine operating conditions. Thus upon an increase in intake manifold vacuum, the correspondingly increased suction in cylinder 66 acting on piston 64 and through the eccentrics 58, on the cylinder unit, overcomes the opposing force on the eccentrics due to the mean effective cylinder force then in effect, and produces a pivotal lowering of the cylinder unit to an extent in direct accordance with the extent of manifold vacuum increase, when a condition of equilibrium will obtain between the suction in cylinder 66 and the then existing mean effective cylinder force reflected on the eccentrics. On the other hand, upon a decrease in intake manifold vacuum, the mean effective cylinder force acts in opposition to the then reduced suction in cylinder 66, to effect through the eccentrics, pivotal lift of the cylinder unit until the reduced suction balances such force, when the cylinder unit will be positioned in direct accordance with the reduced suction. From the foregoing it follows that displacement of the cylinder unit is effected by the differential of forces acting in opposition on the eccentrics 58, but with the control of cylinder unit positioning initiated by and determined in direct accordance with intake manifold pressure or vacuum. Accordingly, with the cylinder compression ratio control as now provided, the cylinder unit will be positioned such as to determine the effective compression ratio most suitable to the fuel volume induced to the cylinder under a given low speed, open throttle operation of the engine. As intake manifold pressure decreases in response to increasing engine speed and/or throttle movements in the closing direction, the cylinder unit positioning control will respond in direct proportion to manifold pressure decreases, to determine the effective compression ratio at correspondingly increased values. Consequently, at any given condition of throttle position and engine speed and loading, the compression ratio then obtaining, will be that most suitable to the volume of fuel induced to the cylinder under such condition.

It is to be noted further in connection with the foregoing, that the suction device as constituted by the piston 64 and cylinder 66, serves additionally and most effectively as a damping expedient or dash-pot, acting to absorb impulses in the opposing forces such as to assure a desirably smooth cylinder unit displacement action of the mechanism in direct response to variations in intake manifold pressure. In this respect, the suction device is particularly effective in the presence of a relatively rapid and substantial change in manifold vacuum, to prevent in consequence thereof, a "hunting" operation of the mechanism productive of momentary over and under displacements of the cylinder unit.

The valve-in-head engine lends itself most advantageously to the character of combustion space variation as here afforded, particularly for the reason that the volume of the cylinder head recess or compression space may be reduced to a predetermined desired minimum more readily than is possible in an engine of L-head type for example, since the latter is limited in this respect because of the lateral extension of the cylinder head recess to accommodate the off-set intake and exhaust valves. However, with over-head valves which open inwardly of the cylinder head recess, valve operation must be carefully determined according to the extent of piston crown projection into the recess at top dead center and when the cylinder unit is lowered to effect a minimum clearance space, in order to avoid interference between the piston crown and the valves when the latter are open. To this end, timing of intake and exhaust valve operation in the present engine, is determined according to the relationship illustrated by the timing diagram of Fig. 6.

Figure 5:
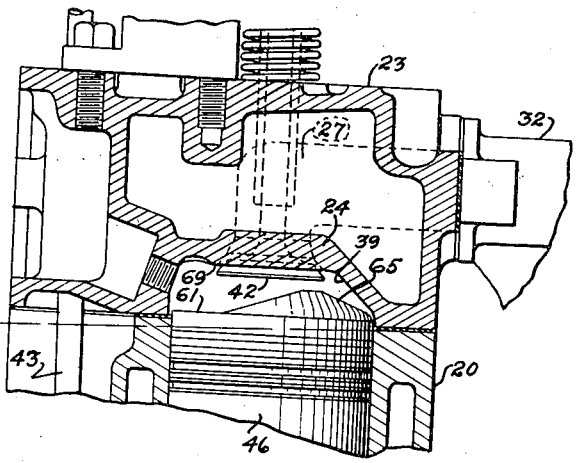
Fig. 5 is a fragmentary sectional view, similar to that of Fig. 4, but illustrating the extent to which the piston when at upper dead center, projects into the combustion chamber when the cylinder unit is displaced to its lowermost limit.
Figure 6:
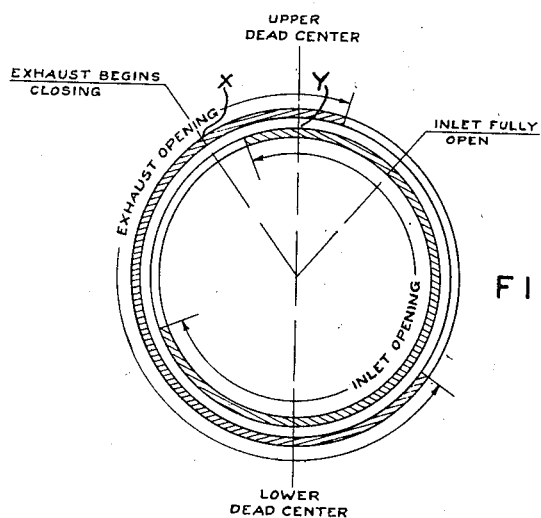
Fig. 6 is a diagram showing the cycle of intake and exhaust valve operation.
Figure 12:
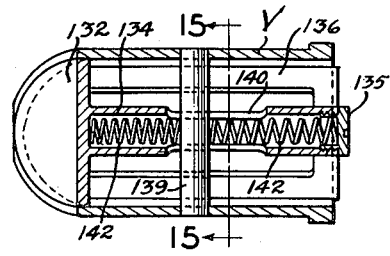
Fig. 12 is a longitudinal sectional view of the modified control valve of Fig. 11.
Figure 13:
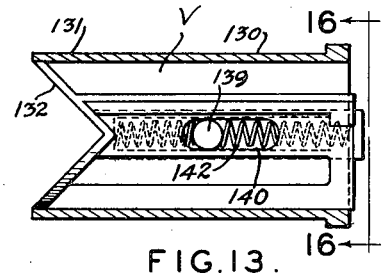
Fig. 13 is a further longitudinal sectional view of the modified valve, taken in a plane normal to the plane of Fig. 12.
Figure 14:
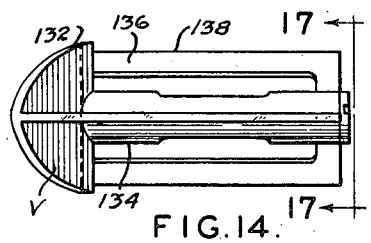
Fig. 14 is a view in longitudinal elevation, of the valve element of the modified valve unit.
Figure 10:
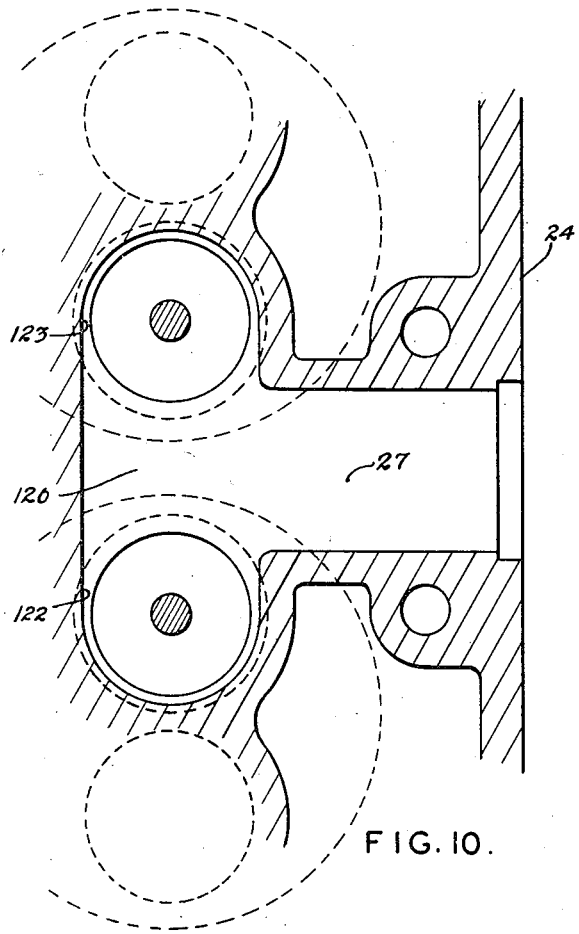
Fig. 10 is an enlarged fragmentary sectional view in plan, of the cylinder head in the region of an intake passage.
Figure 11:
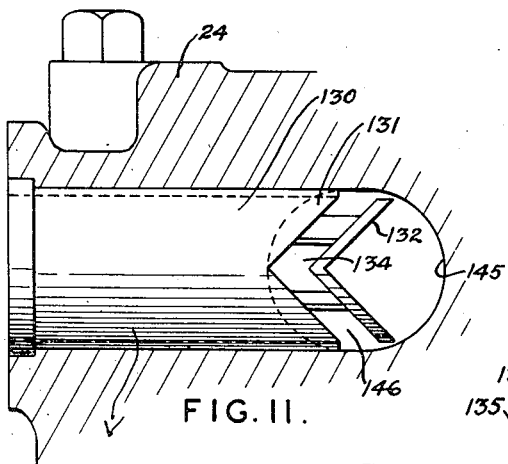
Fig. 11 is a fragmentary sectional view through the intake passage, taken in a plane at a right angle to the plane of Fig. 10, the view showing in operative position in the intake passage, an anti-rejection control valve unit of a modified form.
Figures 15, 16:
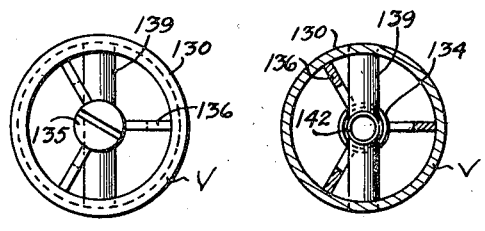
Fig. 15 is a transverse sectional view, as taken along line 15—15 in Fig. 12.
Fig. 16 is an end view of the modified valve unit, as viewed from line 16—16 in Fig. 13.
Figure 17:
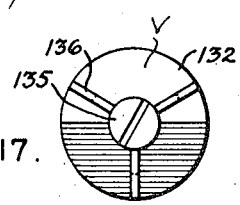
Fig. 17 is an end view of the valve element of the unit, as taken from line 17—17 in Fig. 14.

As appears from the diagram of Fig. 6 wherein the open and closed periods of the valves are measured by crank angles between top and bottom dead center positions of the piston, the exhaust valve may be timed to open appreciably ahead of bottom dead center. Thereafter, the exhaust valve continues open to a point X before top dead center, when it begins to close and may reach full closure at a few degrees past top dead center. With reference to Fig. 5 showing the minimum clearance effected at top dead center of the piston when the cylinder unit is lowered to its maximum extent, the exhaust valve at such time must be at least partly closed, because the piston crown 65 then occupies the space in recess 39 which was occupied by the head of the exhaust valve when in full open position. Accordingly, although the exhaust valve may be timed for full closure after top dead center, as indicated in the diagram, its position at the instant the piston reaches top dead center, must be less than full-open to an extent determined by the extent of projection of the piston crown 65 into recess 39, whereby to avoid valve abutment by the piston crown.

For the same reason, the intake valve must be timed as indicated in Fig. 6, such that its open position Y at top dead center is less than a full-open position, sufficiently at least to avoid contact by the piston crown 65. It will be appreciated of course, that the pivotal cylinder unit may be so related to the stroke of the piston as to limit the maximum projection of the piston crown into the cylinder head recess to an extent such that the valves may be timed for full-open positions at top dead center of the piston, without contact thereof with the piston crown. But such as arrangement may be accomplished only with a material sacrifice of minimum compression volume, and would reduce the high degree of compression control as here afforded.

Turning now to the provisions according to the present invention, for preventing loss of cylinder charge under conditions of reduced or low speed, open throttle operation of the engine, the presently preferred embodiment of a control device for this purpose, is illustrated by Figs. 7, 8 and 9. In each intake passage 27 in the cylinder head 24, is a valve device 70 which most advantageously, is formed and constructed as a unit, for insertion and mounting in the passage. The valve unit, as shown, comprises a tubular member 71 sleeved in the passage 27 and having a flange 72 seating against a shoulder 74 formed by recessing the outer end 27 of the passage. Member 71 may be retained in place by a sealing ring 76 which with a sealing gasket 78, seals the connection of the intake manifold branch 31 to the cylinder head 24. Extending axially of the member 71 is a rod element 79 of an appropriate length as shown, the rod being supported for longitudinal movement relative to sleeve member 71 preferably by a plurality of substantially equally spaced elements 80 each of a thin, plate-like character. The elements are suitably secured to the rod, with the free margin 82 of each in end-wise contact with the inner surface of the sleeve member.

Slidable along the forward end portion 83 of rod 79 is the hub portion 84 of a disc-valve 86, the diameter of the valve being such that its peripheral surface 87 may coact with the internal marginal surface 88 at the inner end of sleeve member 71 (Fig. 8) to close passage 27. Thus surface 88 may be considered as constituting the valve seat for disc-valve 86.

Valve 86 is biased in one direction by a comparatively light coil spring 90 encircling hub 84 and bearing between the rear face of the valve and the ends 91 of the rod supports 80. A further relatively light coil spring 92 provides a bias of the valve in the opposite direction, this spring bearing against the recessed forward face 94 of the valve and the head 95 of a pin 96. Pin 96 projects into a bore or recess 98 formed axially in the forward end 83 of rod 79, and has its head 95 seated against a recessed portion 99 of an inner wall portion 100 of intake passage 27.

A suction motor 102 is arranged externally on the manifold arm 31 in alignment with the valve device 70, the motor including a cylinder 103 having a neck 104 extending through the manifold wall portion 106 and sealed against suction leakage at such juncture, as by a suitable gasket 107. Across the outer open end of the cylinder is a screen 108 which is retained in assembly by a flanged member 110 screw-threaded to the cylinder. Within the cylinder is a piston 111 biased toward the screen end of the cylinder by a spring 112, the piston being shown in Fig. 7 at the outer limit of its movement. Secured to the piston is a relatively long stem or piston rod 114 which projects through a bore 115 in the cylinder neck 104 and inwardly of the manifold branch 31, to reception of its end portion 116 in an axial bore 118 provided in the manifold end section 119 of rod 79. The diameter of cylinder neck bore 115 is sufficiently large with respect to the diameter of the stem 114 passing therethrough, as to afford an appreciable clearance space serving to establish constant communication between the manifold 31 and the interior of motor cylinder 103. Thus the piston 111 is subjected at all times, to manifold pressure. The action and limits of operation of the suction motor will appear presently.

In the valve arrangement as shown, valve 86 is disposed in intake passage 27 substantially at the juncture 120 of the passage branches 122 and 123 (see Fig. 10) leading to the intake valve controlled ports of adjacent engine cylinders. Valve 86 therefor, is anterior to but relatively near the engine operated intake valves 42, which is important to the effective function of the valve in preventing charge loss from the cylinder at low engine speeds.

During conditions of engine operation wherein the intake manifold pressure is comparatively high, as obtains for example, when the engine is operating at low or intermediate speeds with the throttle open, the servo-motor piston 111 may remain substantially in its outermost position shown in Fig. 7, under the bias of its loading spring 112. To this end, the spring 112 is selected or so calibrated as to oppose suction displacement of the piston 111 until overcome by decrease of manifold pressure to or below a predetermined value obtaining in comparatively high speed operation of the engine. Accordingly, so long as the servo-motor is in its initial or inoperative condition as above indicated and shown in Fig. 7, the valve unit 70 is fully operative to check or prevent rejection of fuel charge from the cylinder back into the manifold. For example, when the engine is operating at low speeds with open throttle, the manifold pressure will be correspondingly high and the volume of fuel charge induced to the cylinder in the intake cycle, will be large. Because of the delayed closure of the cylinder intake valve 42 as hereinbefore described, there appears in the period of intake valve closing displacement while the engine piston is moving inwardly of the cylinder in its compression stroke, a tendency to flow reversal or rejection of a portion of the fuel charge from the cylinder back into the intake manifold. At such time, the valve 86 responds to the flow reversal, moving along rod 79 to closed position as illustrated in Fig. 8, wherein the valve periphery 87 is in full cooperation with valve seat 88 to close the intake passage 27. The full-closed position of the valve 86 is here determined by abutment of the valve hub 84 with the ends 91 of rod supports 80. In valve movement from a position such as that shown in Fig. 7 to the closed position of Fig. 8, abutment of the hub with the ends 91 of supports 80, serves to slide the rod 79 and supports in the direction of the manifold branch 31, to an outer limit (Fig. 8) wherein the bottom 124 of the rod bore 118 abuts the end 126 of stem 114 on the servo-motor piston 111. Piston 111 then is at its outer limit of movement (Fig. 7). During the fuel intake cycle, however, the valve 86 moves to an open position in response to cylinder suction and charge flow into the cylinder.

In order to assure rapid response of the check valve 86 to suction and fuel flow forces, the valve is of light construction such that it is characterized by a low moment of inertia. Moreover, the valve is mechanically balanced on the rod 79, by the opposing light springs 90 and 92 which are calibrated or predetermined as to the effective force of each on the valve such as to preserve the desired rapid response characteristic of the valve, while operating to cushion valve closing displacement in particular, whereby to minimize or prevent slamming abutment of the valve hub 84 against the margins 91 of the rod supports 80.

When the manifold pressure decreases to or below a predetermined value, as obtains during high speed operation of the engine for example, the servo-motor piston 111 will be drawn inwardly of its cylinder 103 toward or to its inner limit as shown in Fig. 9. In consequence thereof, the piston stem 114 engages its end 126 with the bottom 124 of rod bore 118 and thence displaces the rod 79 to the right as viewed in Fig. 9, to the position of the rod and its supports 80 shown in the figure. As so positioned, the ends 91 of elements 80 through abutment with the hub 84 of valve 86, dispose the valve in its full-open position. The servo-motor thus renders the check valve inoperative during high speed operation of the engine, when the check valve is not needed, and in holding the valve open under the condition given, thereby prevents objectionable or severe vibration of the valve which would tend to occur were the check valve free to respond to suction and fuel flow forces obtaining at high engine speeds.

From the foregoing description of the check or anti-rejection valve, it now will appear that the valve serves importantly, to prevent back-flow of fuel charge from the cylinder to the manifold prior to intake valve closure in the cylinder compression cycle at low and intermediate engine speeds. Consequently, the compression volume of fuel charge in the cylinder at intake valve closure, will be larger than otherwise, so that with the present provision for regulating the extent of the cylinder-piston clearance or compression space automatically and proportionally to manifold pressure, the optimum compression of the fuel charge may be closely approached under any condition of engine operation, with resultant increased efficiency and power of the engine.

A modified form of anti-rejection or check valve device V of unit character, is shown by Figs. 11 to 17. The modified valve comprises a cylindrical member 130 for positionment in an intake passage 27 of the cylinder head 24 (Fig. 10) member 130 being cut-away at its forward end 131 to form a V-shape end as appears in Figs. 11 and 13. Slidable in the member 130 is a valve structure providing a valve head 132 which is of V-form to correspond with the V-end 131 of the member. Extending centrally from the apex of the head is a hollow stem 134 which is threaded at its open end, to receive a closure element or cap screw 135. The valve structure is slidably seated in the member 130 by a plurality of spider elements 136 each joined to the valve head 132 and to the rear end of the stem 134, the spider margins 138 being in end-wise contact with the inner wall of the member 130. A pin 139 extends transversely in the member 130 through diametrically opposite longitudinal slots 140 in stem 134, and has its end suitably fixed to member 130. The pin 139 serves to maintain the valve structure in assembly to the member 130, and through abutment by the ends of the stem slots 140, determines the maximum limits of displacement of the valve. Mechanical balance of the valve is here afforded by a pair of oppositely acting, comparatively light springs 142 arranged in the hollow stem 134, one thereof between the valve head 132 and pin 139, and the other between pin 139 and the stem closure 135.

The modified check valve unit is positioned in passage 27 (Fig. 11) with its forward V-shape end 131 disposed therein such that when the valve 132 is displaced in the opening direction, as forwardly from the end 131 of member 130 toward passage wall 145 (Fig. 10), the V-shape valve head 132 in cooperation with the similar V-shape end 131 of member 130, defines opposite V-shape openings 146 one in alignment with the branch 122 and the other in alignment with the branch 123 of the passage 27. Thus the valve of the form shown, serves when open, to direct fuel flow to the laterally extending passage branches 122 and 123.

The operation of the modified valve unit is similar to that of the preferred valve embodiment hereinbefore described. The modified valve also is characterized by quick response to suction and flow forces, and is essentially non-slamming in either direction of its displacement, as determined by the cushioning action of the opposed springs 142.

Although not shown, it is to be noted here that a manifold pressure responsive device such as the servomotor 102 (Fig. 7), may be employed with the modified valve unit to hold the valve open during high speed operation of the engine, as and for the purposes heretofore described.

Figure 18:
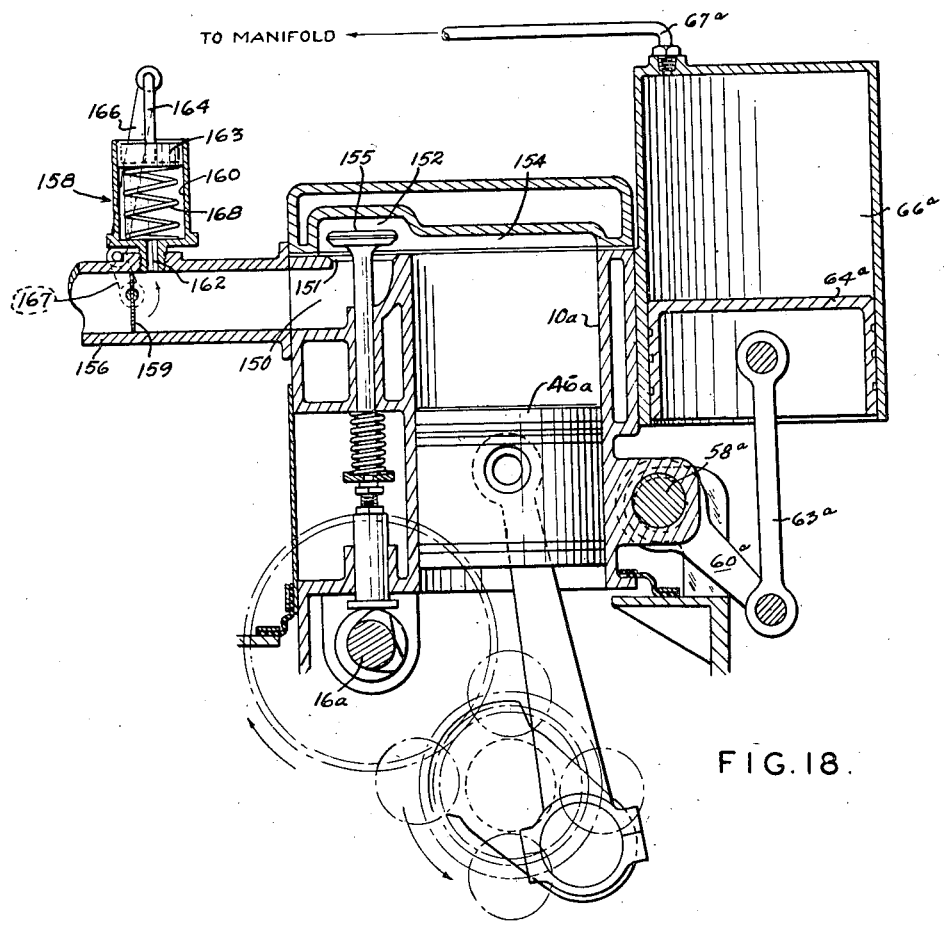
Fig. 18 is a vertical sectional view taken transversely through an engine of the L-head type, showing the application of the features of the present invention to an engine of this type, this view showing the cylinder unit positioned for minimum compression.
Figure 19:
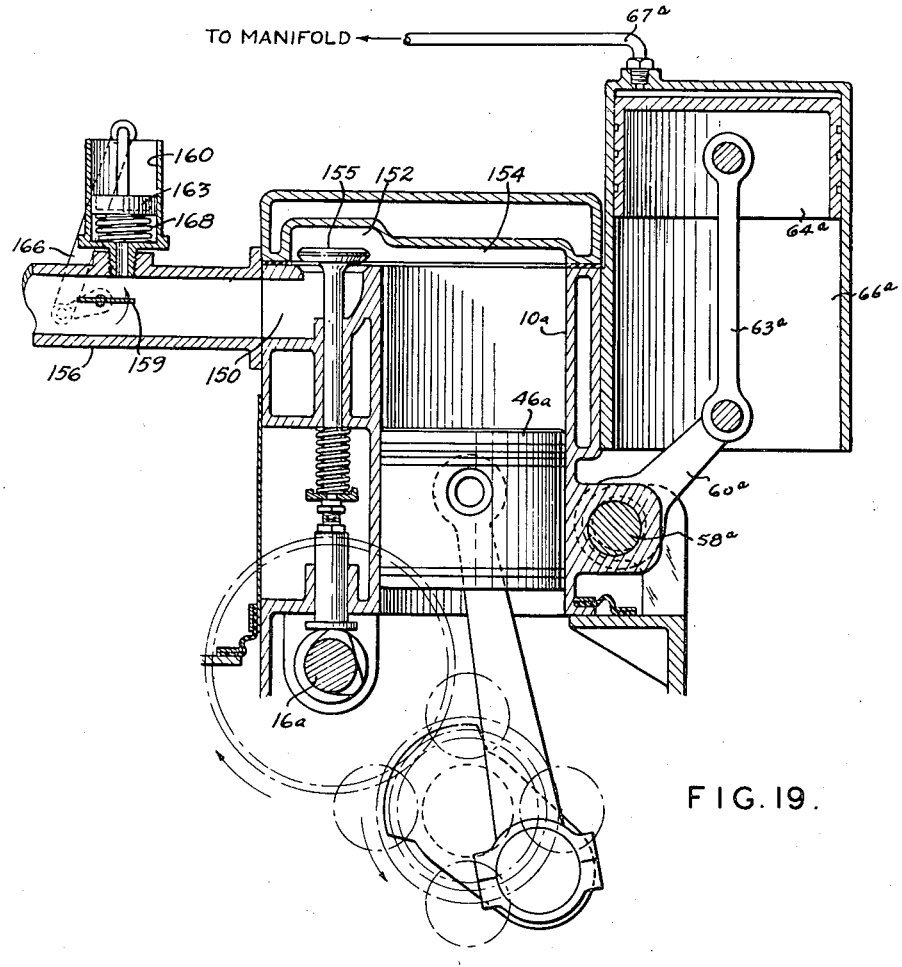
Fig. 19 is a similar sectional view of the L-head engine, but illustrating the cylinder unit in a position for maximum compression, and the intake check valve in an open position.

While the now described provisions comprising means for varying the compression space of the engine cylinders, and intake check valve means of the preferred and modified forms, have been presented in connection with an automotive engine of the valve-in-head type, since this type of engine is particularly suitable for close control of cylinder compression according to the invention, nevertheless, these provisions may be applied advantageously to engines of other types, as the L-head engine shown in Figs. 18 and 19.

The parts of the L-head engine shown, which correspond essentially to the similar parts of the engine as appears in Fig. 2 in particular, are here designated by the same reference characters, each, however, bearing the suffix —a—. The chief differences reside in the adaption of the cylinder block to provide the intake passage 150 forming an intake port 151 at the junction with the lateral extension 152 of the cylinder head recess 154. Controlling the port 151 is an intake valve 155 which is engine operated, as from the camshaft 16a. One branch 156 of the intake manifold (not shown), leads to intake passage 150, and as presently illustrated, a suction and flow responsive control unit 158 including a check valve 159, is operatively associated with the manifold branch. The control unit shown, comprises a cylinder 160 communicating by passage 162 with the interior of the manifold branch at a point between the check valve 159 and the intake valve 155. In the cylinder is a piston 163, the stem 164 of which is operatively connected by link 166, to the actuating arm 167 of the valve 159. A spring 168 of predetermined capacity, urges the piston 163 outwardly, as to the position shown wherein valve 159 is closed.

The operation of this form of check valve, acting to check or prevent back flow of fuel charge during low and intermediate speeds of the engine, corresponds to that of the valves heretofore described. It may be noted here that a check valve of the form shown in Fig. 7, or that shown in Fig. 11, may be provided and adapted for insertion in the cylinder block intake passage 150, in place of the unit 158.

With regard to cylinder compression adjustment, Fig. 18 illustrates the cylinder unit pivotally elevated to its maximum limit, so that the compression space including the head recess 154 and its lateral extension 152, is a maximum. This condition is one which obtains for example, under low speed open throttle operation of the engine when the volume intake is large. As appears in the figure, the piston 46a is traveling inwardly of the cylinder 10a in its compression stroke, while the intake valve 155 is about to close. At such time, the piston 163 of unit 158 is at the outer end of cylinder 160, in response to the pressure of the fuel charge in the intake passage and the tendency to reverse flow of the charge, thereby closing check valve 159 to prevent cylinder loss of charge volume.

Fig. 19 shows the cylinder unit actuated to its opposite extreme position determining a minimum compression clearance, and hence a maximum compression ratio, this condition obtaining at high engine speed, for example. Similarly to Fig. 18, the piston 46a is on its compression stroke, while the intake valve 155 is about to close. However, in this case, the check valve 159 will be open or partly open due to the low pressure in the intake passage, thus permitting cylinder fuel charge intake up to the point of intake valve closure.

Figure 26:
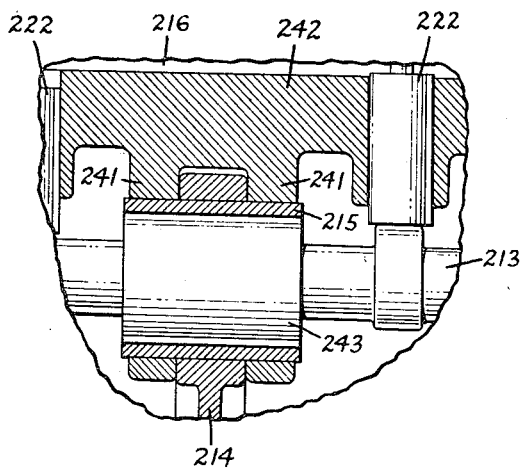
Fig. 26 is a fragmentary sectional view of a modified form of bearing for the camshaft on which the cylinder structure in Fig. 20 is mounted.
Figure 27:
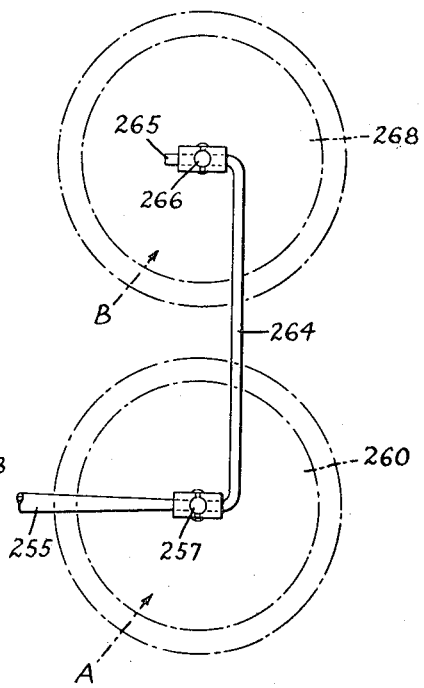
Fig. 27 is a sectional view of the compression ratio control mechanism taken on line 27—27 of Fig. 20.

The engine shown in Figs. 20 to 27 inclusive, may be considered of the multi-cylinder, in-line automotive type, similar to that shown in Fig. 1, one cylinder of which is shown in section and designated by the numeral 210. The crankcase 211 is formed as a separate structure and operatively supported therein are the engine crankshaft 212 and the intake valve camshaft 213, the latter preferably being located near the top of the crankcase and adjacent one side portion thereof. Spaced webs 214 extend transversely in the crankcase and have openings therein for the reception of camshaft bearings 243 and surrounding bearing sleeves 215 as shown in Figure 26.

The cylinder structure is assembled into a complete unit, separate from the crankcase, and comprises a unitary cylinder block 216 providing in-line cylinders 210 and a head block 217 presenting a cylinder head 218 for each cylinder. Operatively carried by the head block is a valve 219 for each cylinder, in control of the cylinder intake port 220, the valve stem projecting through the head structure and being normally closed by spring 221 at the top of the head structure. The set of intake control valves are actuated by camshaft 213 through separate mechanisms each consisting of push rod 222, extending through one side of the cylinder and head blocks, and rocker 223 pivotally mounted on shaft 224 carried by brackets 225 fixed on top of the head block. An exhaust valve 226 for each of the cylinders extends through the head block and is normally closed by spring 227 above the head block. The set of exhaust valves are actuated from camshaft 228, mounted in an overhanging side of the cylinder block above the intake valve camshaft 213, through mechanisms each consisting of push rod 229 and rocker 230 pivotally mounted on shaft 224. Exhaust push rods 229 extend at an angle to the intake push rods with their lower ends mounted to reciprocate in guide openings 231 in the cylinder block overhang and their upper ends extending, with clearance, through openings 232 in the head block. The engine intake manifold is shown at 233 and includes a central inlet neck 234 to which the down draft carburetor 235 is connected. The engine exhaust manifold is shown at 333 and has arms 334 connected with the exhaust passages 335. Branches 262 of manifold 233 each lead to twin cylinder intake passages 263 in the head block. For present purposes, the engine throttle valve is shown at 236 in the curburetor outlet neck 237.

The numeral 238 indicates one of the engine pistons operative in cylinder 210 and connected by rod 239 to an arm 240 of the crankshaft 214 in the usual manner.

Figure 21:
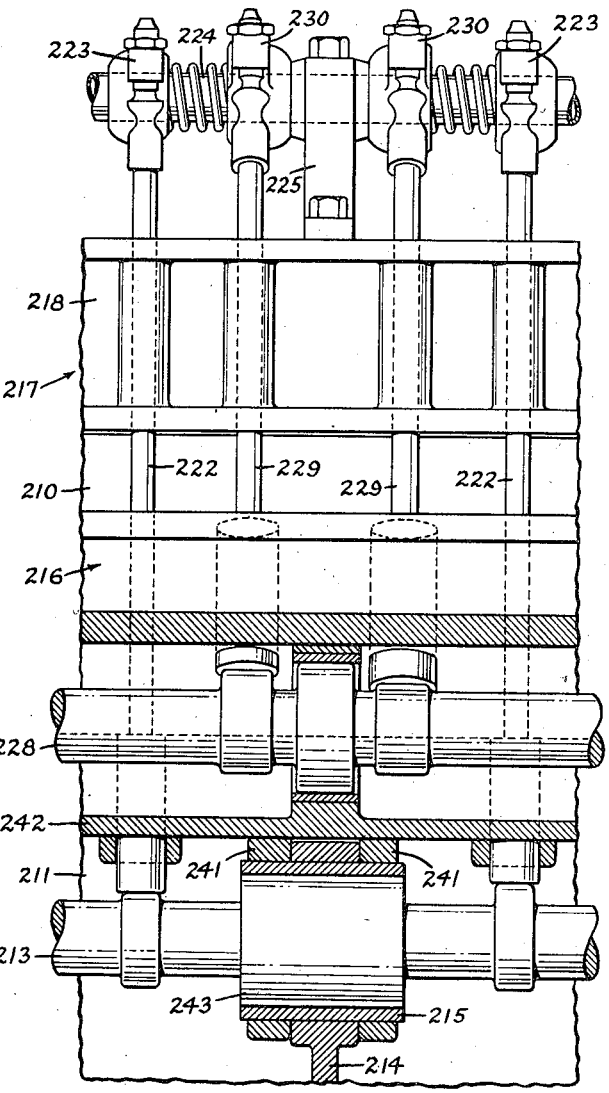
Fig. 21 is a fragmentary sectional view of the engine taken on line 21—21 of Figure 20 showing the modified valve operating mechanism and pivotal connection between the crankcase and cylinder structure.
Figure 23:
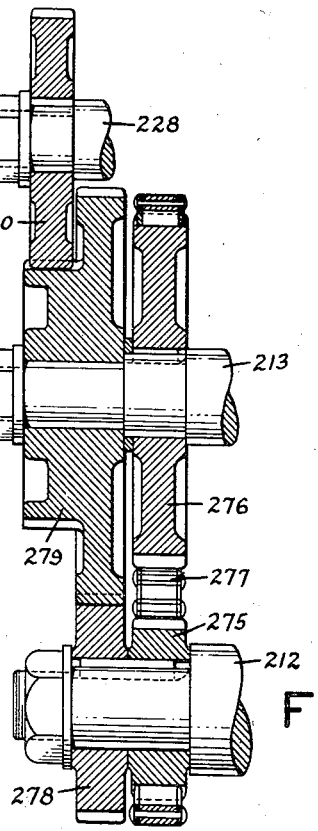
Fig. 23 is a sectional view of the drive mechanism for the camshafts taken on line 23—23 of Fig. 20.

As in the previously described engine structures the cylinder structure, assembled as a complete unit apart from the crankcase assembly, is supported for pivotal displacement relative to the latter and about an axis off-set from the axis of piston displacement or, otherwise stated, from the longitudinal center of the engine. In the present example, the cylinder unit is most advantageously and conveniently pivotally mounted on the end portions of bearing sleeves 215 by bracket members 241 depending from the cylinder block portion 242, such bracket members may be either applied, as shown in Figure 21, or integral with the cylinder structure, as shown in Figure 26. Sleeves 215 and camshaft bearings 243 are relatively long in order to carry the weight of the cylinder structure and to prevent scoring.

The cylinder block side portion 242 is spaced sufficiently inwardly from the crankcase marginal portion, to clear the latter upon pivotal displacement of the cylinder block. As a means for sealing the crankcase in the clearance space 244, against the entrance of foreign matter as well as discharge of crankcase oil therethrough to the engine exterior, a suitable flexible member or diaphragm structure 245 is arranged lengthwise of the crankcase, and one longitudinal margin thereof is sealingly secured or clamped upon the upper side crankcase flange, while its opposite longitudinal margin is similarly clamped to the block side portion 242. Extending longitudinally of the block 216 on the opposite side and at the lower edge thereof, is an outstanding flange 246 which under certain conditions rests upon the inwardly directed flange 247 of the crankcase 211, the latter serving as a stop to limit pivotal displacement of the cylinder block assembly in the clockwise direction, as viewed in Figure 20, under which condition the highest compression ratio will be had as indicated by dotted line 290. A flexible diaphragm 248 seals the crankcase top side wall to the cylinder block flange 246. Also, a like seal (not shown) is provided between each end of the crankcase and the corresponding end of the cylinder block. Thus, the flexible sealing members between the crankcase and cylinder block maintain the desired closure of the crankcase while permitting displacement of the cylinder assembly relative to the latter, in a pivotal manner about the camshaft 213 as an axis.

Pivotal movement of the cylinder assembly is here effected through means of an actuating camming means having a shaft member 249 suitably rotatably supported by bearing standards 250 shown upstanding on the crankcase wall, and carrying spaced arms or eccentrics 251 to the ends of which links 252 are pivotally connected. Links 252 are also pivotally mounted on shaft means 253 carried by brackets 254 fixed to one side of the cylinder structure. If desired, the shaft 249 may be relatively short such as to provide only one eccentric 251, with the latter and cooperating mechanism located preferably near the longitudinal center of the block 216.

A pair of vacuum controlled devices A and B control the camming means for the cylinder structure. Arm 255 has hub 256 keyed or otherwise secured to shaft 249 and is pivotally connected to the lower end of a rod 257 having its upper end connected to a flexible diaphragm 258 secured between two members forming cylinder 260, the cylinder being rigidly secured to bracket 259 fixed to the side of the cylinder block 216. Conduit 261 communicates with the top of cylinder 260 and such conduit connects with manifold 233 posterior of throttle valve 236. Such structure constitutes device A.

Arm 255 has an extension 264, extending parallel with the cylinder structure, and an inturned end 265 to which rod 266 is pivotally attached, such rod being fixed to diaphragm 267 secured between two members forming cylinder 268 that is in line with cylinder 269 and secured to bracket 259. Conduit 269 leads from the interior of carburetor venturi 270 to the top of cylinder 268. Such structure constitutes device B.

Conduit 261 is formed at its base with an enlarged housing portion 271 that is suitably secured on bracket 259 and communicates with cylinder 260 through opening 272 in bracket 259. Disk valve 273 is urged upwardly into seating position in the housing by coil spring 274, the disk valve having a central opening therein of considerably smaller diameter than conduit 261 and opening 272.

Since only a relatively small range of pivotal displacement of the cylinder unit is here necessary to afford compression ratio adjustment suitable to obtain peak compression of any volume of fuel charge admitted under any engine operating condition, the degree of movement of the arms or eccentrics 251 relative to the axis of shaft 249 is correspondingly small. Consequently, the present cylinder unit displacement control affords a decided mechanical advantage in favor of the suction actuated devices A and B.

Before describing the operation of the present improved compression ratio arrangement, it is to be noted that the pivotally raised position of the cylinder assembly, as indicated by line 275 in Figure 20, being one extreme of cylinder positioning, is that which may obtain below a predetermined speed range and under the condition of full load, wide open throttle operation of the engine, when the volumetric intake of the fuel charge is relatively large. Accordingly, in the construction of an engine embodying the present improvements, the peak compression clearance between the co-acting piston and cylinder head surfaces may be determined as to this cylinder structure position but with due regard however, to the opposite extreme of cylinder construction position as shown by dotted line 290 in Figure 20, to afford a degree of peak compression which is most suitable to the large volume intake of fuel charge occurring under the above condition.

During the operation of the engine, the peak compression and combustion pressures in the several cylinders and reacting on the cylinder heads 218, will tend to lift the cylinder assembly about its pivotal support on the camshaft, and in so doing, will tend to turn the shaft 249 through the lifting reaction on the eccentrics 251, such as to pull down the diaphragms in devices A and B against the lifting suction in cylinder 210.

Since in a multi-cylinder engine, of the character herein exemplified, compression and combustion occur sequentially as to the several cylinders or in a predetermined regular order of cylinder firing, the effective cylinder unit lifting force at any instant of engine operation by vacuum anterior or posterior of the throttle valve is the resultant of the compression and combustion pressures obtaining in those of the cylinders undergoing peak compression or combustion at the time. Consequently, throughout engine operation the cylinder unit is subjected to a resultant or mean effective cylinder force or pressure tending to lift the unit. Such mean effective pressure is utilized through reaction on the arms 252 and eccentrics 251 although in reduced effect thereon, as will presently appear, in opposition to the such pressures as the controlling influence of device A or B, to determine cylinder unit positionment in the regulation of cylinder compression.

Through the present mounting arrangement of the cylinder assembly as a unit, affording a pivotal support or anchorage thereof along one longitudinal side of the unit and appreciably off-set from the axis of piston displacement, it will appear that very substantially less than the full mean effective cylinder pressure or force will be effective on the eccentrics 251. Moreover, the actual force on the eccentrics resulting from the above indicated pressures is here additionally reduced by the weight of the entire cylinder assembly which acting about the camshaft as an off-center pivot, provides an appreciable force in opposition thereto. Consequently, by properly designing the vacuum controlled linkage mechanism between the cylinder unit and the suction piston 267 such as to provide in particular and as hereinbefore noted, an effective mechanical advantage in favor of the pistons, or diaphragms 258 and 267, and further, by determining the suction displacement capacity of the devices A and B, the mean effective cylinder force can be reduced in its effect upon the eccentrics 251, as above described, can be balanced with intake manifold or carburetor venturi suction acting on diaphragms 258 and 267 such as to assure pivotal positionment of the cylinder unit in direct accordance with intake manifold or venturi pressure under all engine operating conditions. Thus, upon an increase in intake manifold or venturi vacuum, the correspondingly increased suction acting against diaphragms 258 or 267 and through the eccentrics 251 connected to the cylinder unit, overcomes the opposing force on the eccentrics due to the mean effective cylinder force then present, and produces a pivotal lowering of the cylinder unit to an extent in direct accordance with the extent of manifold or venturi vacuum increase, when a condition of equilibrium will obtain between the suction in devices A and B and the then existing effective force reflective against the eccentrics. On the other hand, upon a decrease in vacuum at either source, the mean effective cylinder force acts in opposition to the then reduced suction in devices A and B, to effect through the eccentrics, pivotal lift of the cylinder unit until the reduced suction balances such force, when the cylinder unit will be positioned in direct accordance with the reduced suction. From the foregoing it follows that displacement of the cylinder unit is effected by the differential of forces acting in opposition on the eccentrics 251, but with the control of cylinder unit positioning initiated by and determined in direct accordance with the venturi or intake manifold vacuum.

When pressure in the manifold suddenly rises, as it does when the throttle valve is suddenly fully opened, it is desirable that the diaphragm of device A should move down quickly in order to decrease the compression ratio as required for the reception of the full charge. As a means of providing for this operating condition, conduit 261 between device A and the manifold is formed with a relatively large diameter and relatively large clearance is provided between valve 273 and its housing 271 so that sudden pressure rise in the manifold will be quickly and adequately transmitted to diaphragm 258 to move it down under the condition described. Valve 273 is normally seated by light spring 274 and the small central opening is adequate to permit suction in the manifold above a predetermined value to raise the diaphragm. Thus, under sudden opening of the throttle valve, device A will respond to manifold pressure to quickly move down and effect the desired decreased compression ration thereby maintaining volumetric efficiency and eliminating detonation. When the throttle valve is closed the small hole in valve 273 prevents such rapid return of air to manifold 233 as would upset the quality of the charge, in case the air in the cylinder 260 is not thoroughly mixed with fuel.

Intake valve camshaft 213 is driven clockwise with the crankshaft at half the crankshaft speed by suitable mechanism illustrated as sprocket 275 fixed on the front end of the crankshaft, sprocket 276 fixed on the camshaft 213 and the chain 277 drivingly connecting the sprockets. The exhaust valve camshaft 228 is also driven clockwise with the crankshaft at one-half crankshaft speed by mechanism of a type that will retard the timing as the cylinder structure pivots toward lowest compression ratio position. Such exhaust camshaft driving mechanism is shown as comprising a gear 278 fixed to the crankshaft adjacent sprocket 276, double idler gear 279, loosely mounted on the camshaft 13, and gear 80 fixed on camshaft 228. Gear 279 meshes with gears 278 and 280.

There is substantially no suction force in either the venturi or intake manifold in engines, of the type described, at low engine speed with wide open throttle so that neither device A or B is effective to overcome the mean effective cylinder force or pressure tending to lift the cylinder structure. This condition also exists at low speed when the throttle is suddenly opened under high load operating conditions. Suction force in the manifold is greatest with the throttle valve substantially closed and with low engine speed and load and, under this condition, device A will be effective to move the cylinder to lowermost position thereby providing the highest compression ratio. As engine speed is increased in the lower speed range with a fully open throttle valve, the manifold vacuum force will increase slightly, but not enough to make device A effective and the cylinder structure will be held by mean effective pressure in its highest position in which lowest compression ratio exists. As the engine speed is increased beyond the lower speed range with an open throttle valve, the full fuel charges will not have time to enter the cylinders so with the lowest compression ratio peak compression is not obtained. In order to improve volumetric efficiency by full compression of such decreased charges the vacuum force at the venturi is now utilized to cause device B to become effective to swing the cylinder unit downward to thereby reduce the compression ratio as the speed increases in the higher speed range of the engine. As the vacuum force at the venturi is higher than the manifold suction, and as it increases as the speed of the engine increases in the high speed range, the compression ratio will thus be increased in accordance with the speed to obtain peak compression of the charges as their volume varies.

To further improve the volumetric efficiency, a supercharger device may be associated with the fuel feeding system. To this end a pump or blower 280 is located in air conduit 281 leading to the carburetor, such blower being rotated by a chain 82 engaging sprocket 283, fixed on the crankshaft adjacent the drive mechanisms for the camshafts, and blower sprocket 291. Air forced in by the blower will speed up the flow of fuel into the engine to thereby increase the volume of the fuel charges flowing into the cylinders, which is of particular advantage in the higher speed range of the engine.

Turning now to examples of the operation of the cylinder compression control arrangement as described, assuming the engine to be started and operating with small throttle valve opening, as for example when idling or under light load and low speed, the intake manifold vacuum will be then relatively high and will be reflected in a correspondingly high suction in the device A, which will cause the diaphragm 258 to assume its uppermost position. Consequently, the eccentrics 251 and arms 252 are thereby actuated in a downward direction to pivotally displace the cylinder assembly to its lowermost position as indicated by dotted line 290. In this position, the compression clearance in the cylinder is at a minimum, thereby affording a desirably high degree of compression of the rarified or small volume fuel charge admitted to the cylinder under the operating condition assumed as above indicated.

Further considering the action of the mechanism, as the throttle is opened to a greater extent, the manifold vacuum will decrease correspondingly, assuming a constant load, so that the diaphragm 258 will lower in cylinder 260 as the cylinder assembly is pivotally raised in reaction to the mean effective cylinder pressure existing at the time of manifold vacuum decrease, until the lowered suction in the cylinder 260 and the mean effective cylinder pressure reflected on the eccentrics, are in equilibrium. The result in the lower speed range is an increase in the peak compression clearance in the cylinder, in direct proportion to the decrease in intake manifold vacuum, which thus affords peak compression more nearly appropriate to the larger volume of fuel charge intake then occurring. Above the lower speed range the fuel charge volume decreases and venturi vacuum will become effective to actuate device B to increase the compression ratio in accordance with speed.

When the venturi or manifold vacuum decreases very materially or approaches a value only slightly below atmospheric pressure, as obtains for example, under the condition of low speed, full load, wide open throttle operation of the engine, the mean effective cylinder pressure then overcoming the very slight suction in the devices A and B, pivotally displaces the cylinder assembly to the extreme low compression ratio position wherein the suction diaphragms are substantially at the bottom of their travel. Consequently, the cylinder peak compression clearance is now at a maximum, but as hereinbefore indicated, sufficient to afford the most effective peak compression of the large volumetric intake of fuel charge then obtaining.

In another instance, assuming the throttle to be retained in a given open position as the engine load is increased or decreased, the intake or venturi vacuum will correspondingly decrease or increase respectively, in dependence upon resulting decrease or increase in engine speed. In consequence thereof and in the manner described above, the cylinder assembly will be pivotally positioned in correspondence with either source of vacuum to adjust the peak compression to the changing volumetric intake of fuel charge. Again, in the event the engine speed changes while the engine loading remains at any given throttle position, the vacuum will change accordingly, resulting as before, in pivotal positionment of the cylinder assembly to adjust the compression to the volumetric intake of fuel charge then obtaining.

Accordingly, it will appear from the foregoing that the present improvements provide a particularly effective compression control arrangement for automatically adjusting cylinder peak compression to the volumetric intake of fuel charge as the latter varies in response to different operating conditions of the engine. An important result of this is that more efficient combustion and greater engine power is realized under any and all throttle positions and under all speed and load conditions.

Another advantage resulting from the angular movement of the intake and exhaust valve axes about the axis of the camshaft is that the timing of these valves is automatically changed to improve fuel economy and to obtain maximum volumetric efficiency under all engine operating conditions.

As the cylinder block swings on its pivot, the push rods for the intake valves are shifted angularly so that the timing of the camshaft actuation thereof will shift. As the cylinder block angle relative to the crankcase is increased the timing of the intake valve opening will be advanced as the cam lobes will contact the rods sooner, and as the cylinder block angle is reduced the timing will be retarded because the cam lobes will contact the rods later. Thus, the timing of the intake valves is retarded as the compression ratio decreases and is advanced as the compression ratio increases.

The timing of the exhaust valves is also shifted automatically as the engine block pivots on camshaft 213, but inversely to the shifting of the timing of the intake valves. Camshaft 228 is carried by the cylinder structure and it shifts therewith in retained relation with the push rods about the axis of camshaft 213. As gear 280 is carried by camshaft 228 and gear 279 is loosely mounted on camshaft 213, pivotal movement of the cylinder structure will cause gear 280 to roll on gear 279 thereby turning the camshaft 228 therewith to advance or retard the timing of the exhaust valves. As the angle of cylinder structure increases relative to the crankcase, gear 280 will roll counterclockwise on gear 279 to advance the time at which the lobes of camshaft 228 will be driven to lift the exhaust valve push rods, and as the angle decreases gear 280 will roll clockwise on gear 279 to retard the time at which the lobes of camshaft 228 will be driven to lift the exhaust valves. Thus, exhaust valve opening is advanced as compression ratio decreases and is retarded as compression ratio increases.

Figures 24, 25:
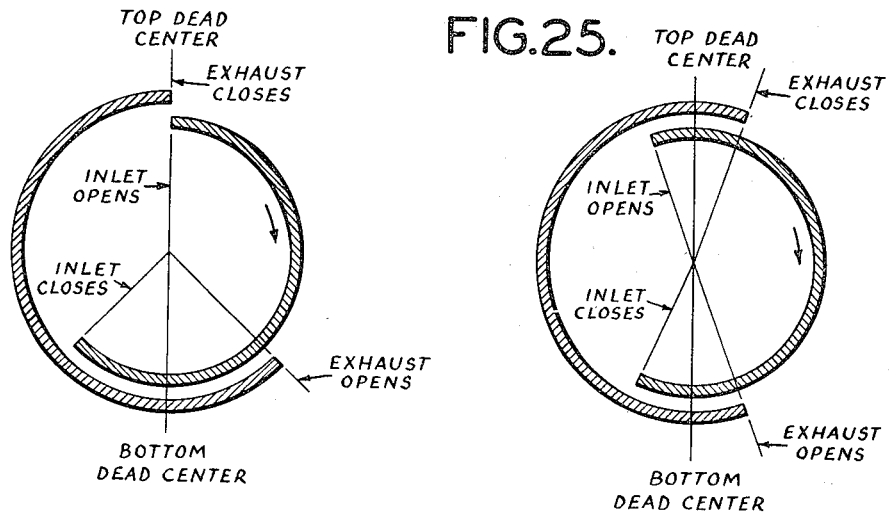
Figs. 24 and 25 are diagrams showing the corresponding valve timing in the two extreme ranges of adjustment for the engine shown in Fig. 20.

Referring to Figures 24 and 25, the two extremes of the timing ranges for the exhaust and intake valves are shown. Figure 24 shows the timing for the highest compression ratio in which the exhaust valves will close just as the intake valves open so there will be complete discharge of exhaust of the fuel charge. Figure 25 shows the timing for the lowest compression ratio in which the exhaust timing is advanced and the intake timing retarded. The exhaust valves close after the intake valves are open to permit the inertia of the exhaust gases and the pressure of the blower 280 to insure complete discharge of the exhaust gas and its replacement with fresh mixture. However, such fuel discharge is much less than the discharge of fuel to complete the discharge of exhaust gas under high speed conditions with a set timing. This variation in the timing improves the fuel economy and aids in obtaining maximum volumetric efficiency in all ranges of open throttle operation.

Figure 22:
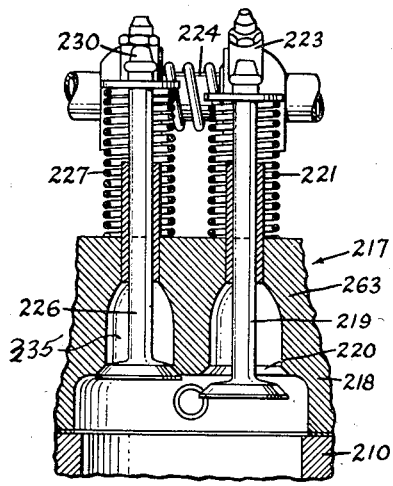
Fig. 22 is a sectional view taken on line 22—22 of Fig. 20, showing the valves for one of the cylinders.

It will be noted from the diagrams shown in Figs. 24 and 25 that the intake valve is open during a portion of the compression stroke in each cylinder so that, unless preventative measures are taken, a portion of the fuel charge will be ejected from the cylinder into the intake manifold resulting in a reduced explosive charge and a reduction in power output. The same check valve mechanisms, as shown in Figs. 7 to 17, employed with the first described form of engine, can be employed here to eliminate such loss of fuel charge. In Fig. 22, the engine is shown equipped with the anti-rejection valve mechanism V, shown in Figs. 11 to 17 inclusive, as a means of preventing loss of fuel charge while the intake valve remains open during the compression stroke, the valve mechanism operating here as previously described.

In this form of the invention there will be practically no loss of fuel charge, a minimum dilution of the fuel charge by exhaust gas and maximum control of the compression ratio for all engine operating conditions.

The invention may be modified in various respects as will occur to those skilled in the art and the exclusive use of all modifications as come within the scope of the appended claims is contemplated.

What is claimed is:

1. In a variable compression internal combustion engine, the combination of, a cylinder and piston assembly including, a cylinder, a cylinder head, a piston reciprocating in said cylinder and cooperating with said head to form a combustion chamber, an inlet passage to said cylinder, an intake conduit connected to said inlet passage, an inlet valve controlling said inlet passage and operated to close during the compression stroke of said piston to obtain volumetric efficiency and a high effective compression ratio at high engine speeds, means to increase the capacity of said combustion chamber at low engine speeds and high conduit pressures to decrease the mechanical compression ratio, and means to partially compensate for unfavorable inlet valve timing at such speeds, comprising a flow responsive check valve adjacent said engine operated valve operating to prevent rejection of the fuel and air charge from the cylinder to the intake conduit and its adverse effect on compression ratio and thereby maintain a substantially full fuel and air charge in said engine for higher torque output at lower engine speeds.

2. In a variable compression internal combustion engine, a cylinder having a combustion space in one end and an inlet passage to said space, an intake conduit leading to said inlet passage, a piston in the cylinder movable into and from said combustion space, said cylinder being positionable relative to said piston for varying the extent to which the piston moves into said combustion space, means for determining the position of the cylinder in accordance with the pressure in said intake conduit, an engine operated valve in control of said inlet passage operated to close after the piston intake stroke, a flow responsive valve in the inlet passage anterior to the engine operated valve, said flow responsive valve being operable to prevent return flow of fuel from the combustion space to the intake conduit in the periods of closing movement of the engine operated valve, under conditions of comparatively high pressure in the intake conduit occurring at the end of the compression period during low or intermediate engine speed, and means responsive to relatively high vacuum conditions in the intake conduit for rendering said flow responsive valve inoperative.

3. In a variable compression internal combustion engine, a cylinder having an inlet passage, an intake conduit leading to said passage, a crankshaft, a camshaft driven from the crankshaft, a piston connected to the crankshaft and operable in the cylinder, means pivotally mounting the cylinder on the camshaft as a pivotal axis, means connected to the cylinder and effective to determine pivotal movement of the cylinder responsively to and in accordance with variations in intake conduit pressure, a valve operated from said camshaft to close after completion of the piston intake stroke and controlling said inlet passage, a check valve in said inlet passage, operable to prevent return flow of fuel through the passage in the periods of closing movement of said camshaft operated valve, under conditions of comparatively high pressure in said intake conduit created under low speed engine operating conditions, and means responsive to relatively high vacuum conditions in the intake conduit for rendering said check valve inoperative under conditions of comparatively low pressure in the intake conduit.

4. In a variable compression internal combustion engine, the combination of, a cylinder and piston assembly including, a cylinder, a cylinder head, a piston reciprocating in said cylinder and cooperating with said head to form a combustion chamber, an inlet passage to said cylinder, an intake conduit connected to said inlet passage, an inlet valve controlling said inlet passage and operated to close during the compression stroke of said piston to obtain volumetric efficiency and a high effective compression ratio at high engine speeds, means to increase the capacity of said combustion chamber at low engine speeds and high conduit pressures to decrease the mechanical compression ratio, means to partially compensate for unfavorable inlet valve timing at such speeds, comprising a flow responsive check valve adjacent said engine operated valve operating to prevent rejection of the fuel and air charge from the cylinder to the intake conduit and its adverse effect on compression ratio and thereby maintain a substantially full fuel and air charge in said engine for higher torque output at lower engine speeds, and means responsive to relatively high vacuum conditions in said intake conduit for rendering said flow responsive check valve inoperative.

5. In an internal combustion engine, a cylinder having a combustion chamber in one end thereof and inlet and exhaust passages communicating with the combustion chamber, an intake conduit leading to said inlet passage, inlet and exhaust valves in control of said inlet and exhaust passages and arranged to open into said combustion chamber, said inlet valves being operated to close during the compression stroke, means for opening the valves at predetermined times in the engine cycle, a piston in the cylinder and movable into the combustion chamber at other predetermined times in the engine cycle, means including an operating device responsive to intake conduit pressure, for varying the operative relationship of the cylinder and piston to vary the extent to which the piston is movable into the combustion chamber, whereby to vary the compression ratio of the engine in accordance with variation in the intake conduit pressure, and a flow responsive valve in the inlet passage anterior to said inlet valve, operable to prevent return flow of fuel through the inlet passage in the periods of closing movement of the inlet valve, only under conditions of comparatively high pressure in the intake conduit occurring during low speed engine operation, and means responsive to relatively high vacuum conditions in the intake conduit for rendering said flow responsive valve inoperative under conditions of comparatively low pressure in the intake conduit.

6. In an internal combustion engine having an intake conduit, a crankcase, a cylinder assembly shiftably mounted on the crankcase, a crankshaft in the crankcase, pistons in the cylinders of the assembly, connecting rods between the pistons and crankshaft, and inlet and exhaust valves, means responsive to vacuum conditions in the intake conduit for shifting the cylinder assembly with respect to the crankshaft for obtaining maximum volumetric efficiency and fuel economy under varying operating conditions comprising a control member connected with the cylinder assembly operated in response to speed and load conditions, and means operable by shifting of the cylinder assembly for automatically varying the timing of the fuel introduction valves and exhaust gas discharge valves inversely relatively to each other in accordance with changes in the position of said control member.

7. In an internal combustion engine having a crankshaft carrying case and a cylinder structure carrying sets of intake and exhaust valves, a camshaft mounted in the case on which the cylinder structure is pivotally mounted, mechanisms for actuating the set of intake valves operated by the camshaft, a second camshaft carried off center from the other camshaft by the cylinder structure, mechanisms operated by the second camshaft for actuating the set of exhaust valves, and drive mechanisms for the camshafts actuated by the crankshaft, pivotal shifting of the cylinder structure shifting the intake valve operating mechanisms relative to the case carried camshaft to vary the intake valve timing and the drive mechanism for the second camshaft being influenced by pivotal shifting of the cylinder structure to change the timing of the set of exhaust valves inversely to and simultaneously with the timing of the set of intake valves.

8. In an internal combustion engine, a case having a crankshaft mounted therein, webs in one side of the case carrying a camshaft, mechanism for driving the camshaft from the crankshaft, a cylinder structure pivotally mounted on the camshaft, and movable thereon to vary the compression ratio, mechanisms including push rods carried by the cylinder structure for actuating the set of intake valves, said rods being arranged for operation by the camshaft and adjustable with the cylinder structure whereby the timing of the intake valve opening advances with increased compression ratio and retards with increased compression ratio, a camshaft carried by the cylinder structure, mechanisms including push rods carried by the cylinder structure for actuating the set of exhaust valves, said last mentioned push rods being arranged for actuation by the camshaft carried by the cylinder structure, and mechanism for driving the exhaust valve actuating camshaft from the crankshaft at the same speed as the other camshaft, the timing effect of said exhaust valve cam driving mechanism varying with pivotal movement of the cylinder structure.

9. In an internal combustion engine of the variable compression ratio type having an intake manifold and a pivoted cylinder assembly, means operable to swing the cylinder assembly on its pivot to control the compression ratio, a vacuum motor for actuating said means, a conduit of relatively large diameter connecting the motor and the intake manifold, said conduit having an enlarged portion forming a valve housing, a disk valve in the valve housing having a relatively small central opening, the diameter of said valve being substantially smaller than the diameter of the housing, and a light spring seating the valve in the housing, said valve being opened by sudden rise in the manifold pressure.

10. In an internal combustion engine of the variable compression ratio type having an intake manifold, vacuum responsive means for controlling the compression ratio in accordance with the fuel charge volume to obtain peak compression of the charges under all operating conditions including a diaphragm, conduit means between the diaphragm and the intake manifold under high vacuum conditions, and shiftable valve means in the conduit means for varying the effective area of the restriction therein in response to pressure in the manifold whereby the restriction is minimized when manifold pressure is highest.

11. In an internal combustion engine having a crankshaft carrying case, a cylinder structure carrying sets of intake and exhaust valves, a camshaft mounted in the case on which the cylinder structure is pivotally mounted, means operable to pivotally swing said cylinder structure on its pivot, mechanisms for actuating the set of intake valves operated by the camshaft, a second camshaft carried off center from the other camshaft by the cylinder structure, mechanisms operated by the second camshaft for actuating the set of exhaust valves, mechanism connected to drive the intake camshaft from the crankshaft, and a train of gears drivingly connecting the crankshaft with the exhaust valve operating camshaft, whereby pivotal shifting of the cylinder structure shifts the intake valve operating mechanisms relative to their operating camshaft to vary the intake valve timing and to modify the relation of the train of gears for the second camshaft to change the timing of the set of exhaust valves inversely to and simultaneously with the timing of the set of intake valves.

References Cited in the file of this patent

UNITED STATES PATENTS

| | | |
|---|---|---|
| 1,219,781 | Salisbury | Mar. 20, 1917 |
| 1,733,975 | Osterhout | Oct. 29, 1929 |
| 1,812,572 | Talbot | June 30, 1931 |
| 2,091,924 | Harmon | Aug. 31, 1937 |
| 2,132,092 | Arthur | Oct. 4, 1938 |
| 2,134,889 | Phillips | Nov. 1, 1938 |
| 2,205,458 | Ball | June 25, 1940 |
| 2,367,606 | Olson | Jan. 16, 1945 |
| 2,433,639 | Woodruff et al. | Dec. 30, 1947 |
| 2,523,105 | Ericson | Sept. 19, 1950 |